United States Patent [19]

Haller et al.

[11] 4,328,411
[45] May 4, 1982

[54] CUTTING AMORPHOUS METAL BY CRYSTALLIZATION WITH A LASER OR ELECTRON BEAM

[75] Inventors: Theodore R. Haller, Schenectady; Marshall G. Jones, Scotia; Gerald B. Kliman, Schenectady; Russell E. Tompkins, Scotia, all of N.Y.

[73] Assignee: General Electric Company, Schenectady, N.Y.

[21] Appl. No.: 144,538

[22] Filed: Apr. 28, 1980

[51] Int. Cl.³ .............................................. B23K 15/00
[52] U.S. Cl. ................................. 219/121 EH; 29/596; 219/121 EB; 219/121 EM; 219/121 L; 219/121 LG; 219/121 LM; 225/2; 225/93.5; 225/96.5
[58] Field of Search .... 219/121 L, 121 LM, 121 LG, 219/121 LH, 121 LJ, 121 LK, 121 LL, 121 LN, 121 EB, 121 EM, 121 EH, 121 EJ, 121 EK; 225/2, 93.5, 96.5; 29/413, 414, 596, 68

[56] References Cited

U.S. PATENT DOCUMENTS

| | | | |
|---|---|---|---|
| 2,298,528 | 10/1942 | De Causse | 219/68 |
| 3,285,098 | 11/1966 | Beveridge | 29/413 X |
| 3,453,097 | 7/1969 | Häfner | 225/93.5 X |
| 3,610,871 | 10/1971 | Lumley | 219/121 LJ X |
| 3,629,545 | 12/1971 | Graham et al. | 219/121 L |
| 3,695,497 | 10/1972 | Dear | 225/93.5 X |
| 3,696,504 | 10/1972 | Cupler | 219/121 L X |
| 3,800,991 | 4/1974 | Grove et al. | 225/2 |
| 3,818,577 | 6/1974 | Bailey et al. | 219/121 LM X |
| 3,958,732 | 5/1976 | Aoyama et al. | 225/2 |
| 3,970,819 | 7/1976 | Gates et al. | 219/121 LJ |
| 4,044,936 | 8/1977 | Obersby et al. | 219/121 L X |
| 4,109,841 | 8/1978 | De Torre | 225/96.5 |
| 4,155,397 | 5/1979 | Honsinger et al. | 164/5 |
| 4,187,441 | 2/1980 | Oney | 310/112 |

FOREIGN PATENT DOCUMENTS 2743544  3/1979  Fed. Rep. of Germany ...... 219/121 LG

*Primary Examiner*—C. L. Albritton
*Attorney, Agent, or Firm*—William H. Steinberg; James C. Davis, Jr.; Marvin Snyder

[57] ABSTRACT

A rapid method of cutting thin amorphous metal sheet material is to use a focused heat source such as a laser beam or electron beam to heat local regions of the material above the crystallization temperature and form brittle crystalline lines along which the material fractures when it is mechanically deformed as by passage through a set of rollers. The material is not melted and does not form burrs. A higher packing factor is possible for motor and transformer laminations.

13 Claims, 3 Drawing Figures

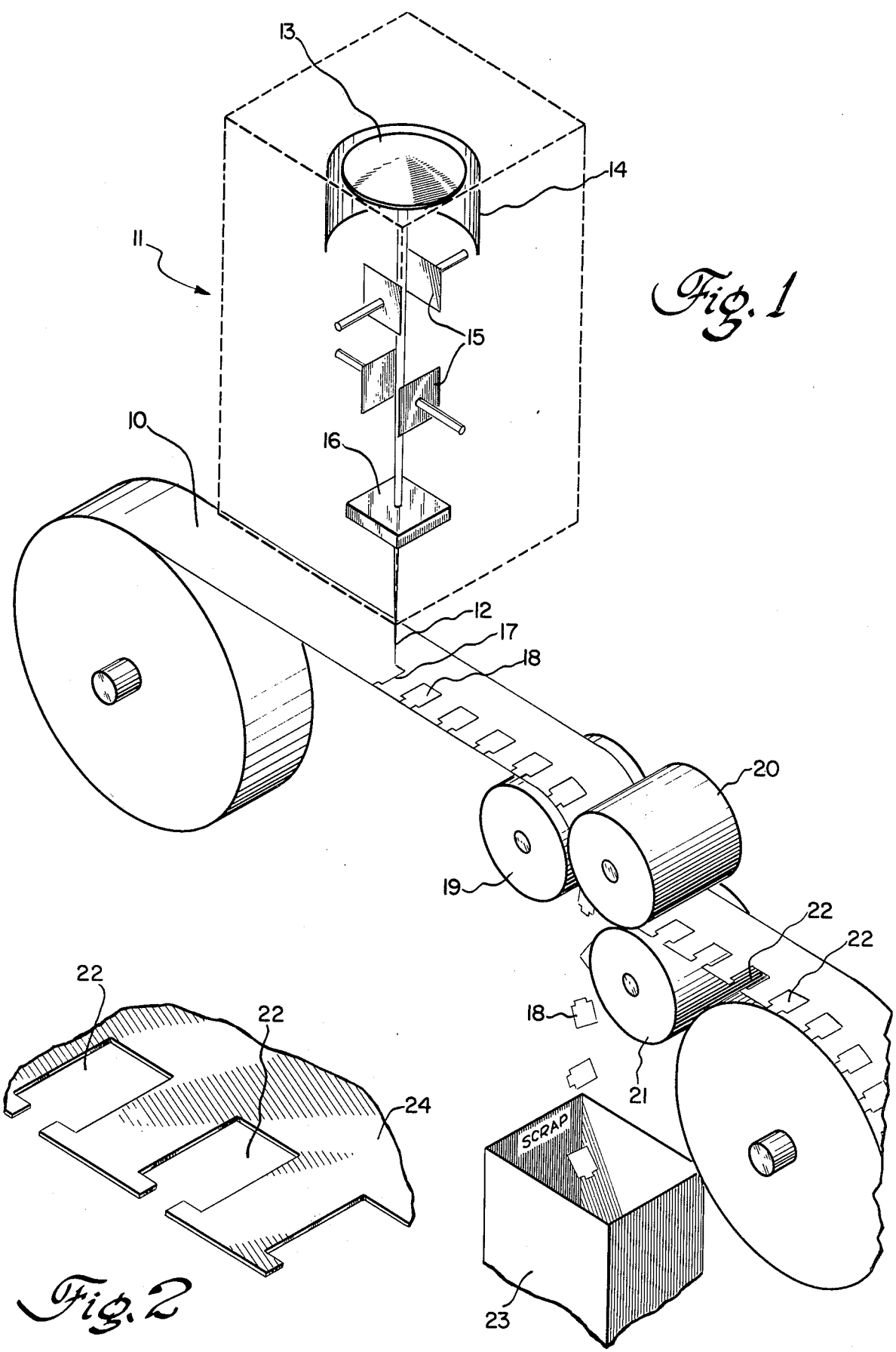

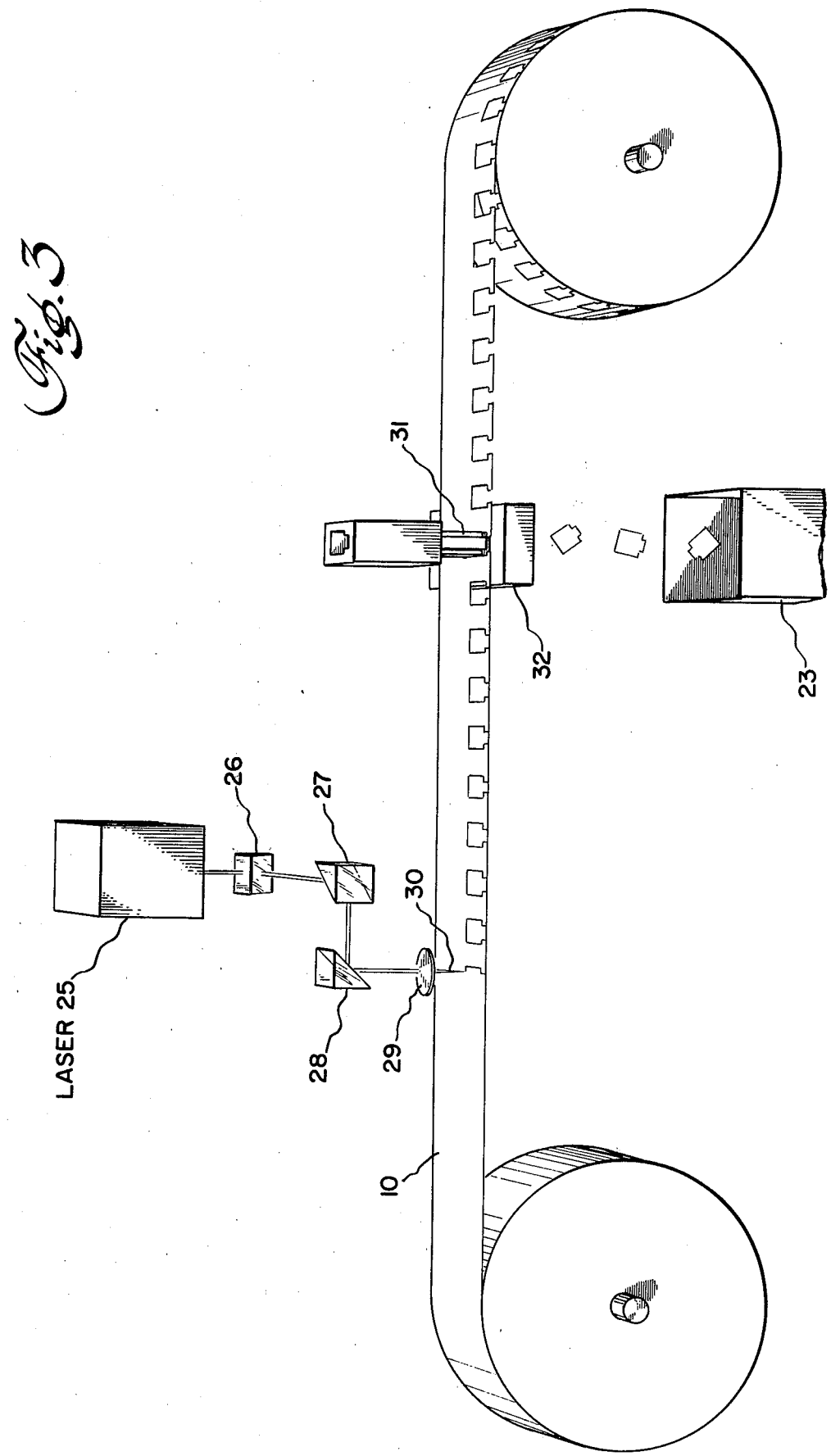

CUTTING AMORPHOUS METAL BY CRYSTALLIZATION WITH A LASER OR ELECTRON BEAM

BACKGROUND OF THE INVENTION

This invention relates to cutting or severing thin amorphous metal material and especially to a method which does not result in the production of burr on the cut edge.

Amorphous metals present an attractive opportunity to substantially reduce magnetic losses in electrical machinery and transformers. The losses in these magnetic materials are at least a factor of 10 lower than those normally encountered in the best magnetic steels. Unfortunately, the physics of the amorphous metal forming process requires that thicknesses of the material be no more than one and one-half or two mils in total. This is in contrast to normal electrical sheet thicknesses which are on the order of 20 mils in thickness. Consequently, if conventional technology were employed to form punchings from amorphous metal sheet, there would be a ten to twenty fold increase in the number of punchings which have to be produced, and furthermore since the material thicknesses is reduced by the same factor, die clearances and precision of punch presses would have to be improved accordingly. While the technical feasibility of punching materials of that thickness is being evaluated, even if successful, this process is likely to be tedious and expensive.

It is possible to cut completely through amorphous metals using laser beams or electron beams, but if this is done the cutting rate is unacceptably slow and molten or vaporized material adjacent to the cut edge tends to run or recondense, forming burrs which prevent compact stacking of the resulting cut laminations. Stator slot cutting of amorphous metal tape by a laser beam is disclosed in U.S. Pat. No. 4,187,441 to W. R. Oney. A process for fabricating shaped laminations directly from the liquid alloy melt is covered by U.S. Pat. No. 4,155,397 to V. B. Honsinger and R. E. Tompkins. Both are assigned to the instant assignee.

SUMMARY OF THE INVENTION

An effective but inexpensive technique is provided for cutting amorphous metal sheet to a desired final shape without producing a burred edge and with a minimum energy input requirement. Local regions of the material are heated above its crystallization temperature without melting the material to form crystalline lines which are inherently brittle. The sheet containing the crystallized lines is then deformed by running it through a set of rollers or by other mechanical means. While the amorphous metal is relatively ductile, the crystallized regions are brittle and the material in these regions fractures causing a separation to occur along the crystallized lines. Since no material is raised above the melting temperature, there is no tendency to form burrs and other irregularities along the cut edge. This permits higher packing factors when laminations so cut are stacked.

Thin lines of amorphous metal sheet or ribbon are crystallized by a focused electron beam, laser beam, or other highly focused heat source, moving the material and energy source relative to one another to scribe the crystallized lines. By controlling the energy source power output and the focused beam transfer speed across the material, the amount of heating and crystallization is controlled. All or a portion of the thickness of the material may be crystallized. The electron beam preferably penetrates the entire thickness and crystallizes the material all the way through; the laser beam desirably is controlled to crystallize about one-half to two-thirds of the thickness of the material and avoid melting at the top surface.

BRIEF DESCRIPTION OF THE DRAWINGS

FIG. 1 shows producing a strip of motor laminations from amorphous metal ribbon using an electron beam system and a set of rollers;

FIG. 2 is an enlarged perspective view of a burrless slotted lamination; and

FIG. 3 is a diagram of a laser for embrittlement scribing of amorphous metal tape and a punch and die to separate the scrap.

DESCRIPTION OF THE PREFERRED EMBODIMENTS

Thin amorphous metal material can be crystallized by raising the temperature above a characteristic temperature for a prescribed period. When a thin line is crystallized through all or part of the thickness of an amorphous metal sheet, the sheet may be fractured along the line because the crystallized material is inherently brittle. A means of crystallizing a thin line of material is with an electron beam or a laser beam. Since these are highly focusable heat sources, they can be used to heat thin lines of material. The thin lines can be generated by either moving the material past the electron or laser beam, moving the electron or laser beam across the material, or a combination of these. By controlling the power output of the source of energy and the focused beam transfer speed across the material, the amount of line heating and crystallization is controlled.

Since the heat input from a highly focused beam is rapid, the heat affected zone (HAZ) is small, and this means that the material is still amorphous near the crystallized line. Typical line widths produced by the laser beam are two times material thickness while the HAZ is less than two times material thickness; line widths generated by the electron beam process are even narrower. Amorphous metal tape currently available is two mils or less in thickness. A major advantage of this process is that no burrs can be formed since melting is avoided. This means that higher packing factors are possible when the burrless laminations are stacked. Since the crystallization temperature is on the order of only a few hundred degrees over ambient, and since only a very narrow line needs to be raised to this temperature, the energy requirements for cutting the material with this technique are markedly reduced compared to a laser cutting or electron beam cutting procedure where material is actually removed by the beam. The material may be crystallized all the way through or only a portion of the thickness, for instance, one-quarter.

A technique for making a motor lamination is to rapidly trace out the shape of a "punching" using an electron beam which is magnetically or electrostatically deflected in combination with mechanical movement of the workpiece or electron gun. After being "written on" or "scribed" with such a beam, the material containing the crystallized linear regions is deformed by running it through a set of rollers or by other mechanical means such as striking with a shaped die, causing a fracture to occur in the crystallized line regions. In FIG. 1, amorphous metal ribbon or strip 10 is unwound from a supply roll and moves at a constant rate of speed beneath an electron beam system 11 which generates a finely focused electron beam 12. This system is conventional and essentially has a source of electrons 13, a beam focusing lens 14, first and second pairs of orthogonal plates 15 for electrostatically deflecting the focused beam, and a window 16 to pass the electron beam into the atmosphere. Magnetic deflection is also possible and may be preferable. The beam deflection is computer-controlled and the beam is capable of scanning the amorphous material at a high rate of speed which in some cases may be at television scan rates.

Scribed crystalline lines 17 trace the outline of a stator slot and the embrittled linear regions are visible to the human eye. Electron beam 12 merely raises the temperature along the cutting line slightly above the crystallization temperature which may typically be 400°–500° C. in these materials. Beam powers on the order of 0.1 to 10 watts are typical. Good results are realized when the beam power is such that electrons penetrate the entire thickness of the material depositing their energy relatively uniformly, heating and crystallizing the total thickness of the ribbon. High voltages and low currents are used to heat just a narrow line all the way through the material. The line width has been observed to be about equal to the depth of penetration and thus is 1–2 mils wide. Scrap areas 18 are removed by passing the ribbon through a set of rollers which deform the material and cause fractures to occur along crystallized lines 17. A steel roller 19 and opposing rubber rollers 20 and 21 are illustrated but other combinations are possible. The strip of motor laminations with cut stator slots 22 does not have burred edges and is wound up compactly. Scrap areas 18 are collected in a container 23 and may be recycled to the amorphous metal alloy melt.

Referring to FIG. 2, the enlarged perspective of motor lamination 24 shows that stator slots 22 are cut into the ribbon without the production of burrs on the cut edges. This permits a higher packing factor when laminations so cut are stacked or wound directly in contact with one another without interlaminar insulation. The amorphous metal ribbon itself, before the cutting and shaping process, is burrless and is prepared by rapid quenching of a stream of molten metal on a rotating drum. Various magnetic alloy compositions are known, and among these are $Fe_{80}B_{20}$, $Fe_{82}B_{15}Si_3$, $Fe_{82}B_{13}Si_3C_2$, and $Fe_{40}Ni_{40}P_{14}B_6$.

Alternatively, the embrittlement scribing with an electron beam can be performed entirely within the vacuum enclosure of system 11. The patterning or shaping of amorphous metal ribbon 10 depends upon the application, and one example is a strip of "E", "C", or "U" transformer laminations that are cut apart at a later stage. The speed of the electron beam can be taken advantage of to cut whole round motor laminations from wide sheets projected to be available in a few years. Laminations for other electromagnetic devices are within the purview of the invention, as are thin burrless laminations for many nonelectrical products. For the latter, there are many non-magnetic amorphous metal alloy compositions that are known and may be more suitable. Another technique of deforming the ribbon with scribed crystalline lines to remove the scrap areas is to tap the ribbon with an electromagnetic vibrator as shown in Pat. No. 4,155,397, the disclosure of which is incorporated herein by reference.

The burrless cutting process illustrated in FIG. 3 uses a focused laser beam to crystallize a thin line of amorphous metal and a shaped die to punch or press out the scrap. Ribbon 10 moves intermittently and while it is stopped, the focused laser beam traces the outline of a stator slot and a line of crystallized material. Laser 25 generates a beam which is moved about and focused by a set of three prisms and an objective lens. One prism 26 is rotatable, a second prism 27 moves forward and back in the X direction, and prism 28 and objective lens 29 move together as a unit in the Y direction. After the ribbon is "written on" with laser beam 30, it passes between a shaped punch 31 and a die 32 where the scrap areas are punched out.

The preferred set of conditions are that the laser power and speed of the moving beam relative to the stationary workpiece are selected to crystallize only about one-half to two-thirds the thickness of the amorphous metal material. The temperature at the top surface is higher than at the interior of the material and this avoids melting at the top. Photons are absorbed at the surface and the remainder of the thickness of the ribbon is heated by conduction. It is often best to have the focused laser beam remain stationary and to move the ribbon and workpiece table about beneath it.

One reduction to practice used a $CO_2$ laser for line heating, which was continuous wave and had a wavelength of 10.6 micrometers, and a four inch focal length objective lens was used for focusing purposes. Two conditions were tested. The transfer speed of the material was fixed at one inch per second and the power from the laser set at 50 and 100 watts. When using 100 watts, some melting and distortion of the amorphous metal occurred, resulting in fracturing without burrs. Reducing the laser power to 50 watts eliminated melting and distortion but with crystallization still occurring with no visible effect on the amorphous metal. Therefore, the operating parameters of 50 watts and one inch per second feed is one successful combination. Tests also showed that crystallization ceased when 40 watts was used and evidence of melting occurred when the power was increased to 60 watts with all other conditions the same. The relationship is linear, and with a laser power of 100 watts the transfer speed of the material would be two inches per second.

A system with plural electron beams each of which scribes part of the outline of a stator slot, or other traced line, makes the equipment more flexible and allows the ribbon to travel faster.

It is economical to use multiple guns, each cutting a section of the pattern. Similarly, plural laser beams speed up the process.

This is a low cost effective technique for cutting amorphous metal sheet or ribbon to a desired final shape without producing a burred edge and with a minimum energy input requirement. Amorphous metal magnetic cores do not require insulation between the laminations, unlike cores of steel laminations or other conventional materials, and thus it is important to have burrless edges.

While the invention has been particularly shown and described with reference to preferred embodiments thereof, it will be understood by those skilled in the art that various changes in form and details may be made therein without departing from the spirit and scope of the invention.

The invention claimed is:

1. A method of cutting thin amorphous metal sheet material comprising the steps of:
- temporarily non-contact heating local regions of said amorphous metal sheet above its crystallization temperature without melting the material to form crystalline lines within the amorphous metal which has a non-crystalline structure; and
- mechanically deforming said amorphous metal sheet to produce fractures along said crystalline lines and separate a burrless lamination with the desired shape.

2. The method of claim 1 wherein the step of heating local regions of said sheet material comprises moving a focused electron beam and said sheet relative to one another to scribe said crystalline lines.

3. The method of claim 1 wherein the step of heating local regions of said sheet material comprises moving a focused laser beam and said sheet relative to one another to scribe said crystalline lines.

4. A method of cutting thin amorphous metal ribbon material comprising the steps of:
- moving a focused heat source and said amorphous metal ribbon relative to one another to heat local regions of the non-crystalline amorphous metal material above its crystallization temperature without melting the material to form crystalline lines within the non-crystalline amorphous metal; and
- mechanically deforming said ribbon to fracture the material along said crystalline lines and separate an amorphous metal lamination with the desired shape which does not have burrs along the fractured edges.

5. The method of claim 4 wherein said focused heat source is an electron beam and the power of said electron beam and relative movement of said electron beam and ribbon are controlled such that electrons penetrate completely through the amorphous material and the entire thickness of the amorphous material is crystallized.

6. The method of claim 5 wherein said ribbon is mechanically deformed and scrap areas are separated from the desired lamination by passing said ribbon through a set of rollers.

7. The method of claim 4 wherein said focused heat source is a laser beam generated by a continuous wave laser and the power of said laser beam and relative movement of said laser beam and ribbon are controlled to crystallize about one-half to two-thirds of the thickness of the material.

8. The method of claim 7 wherein said ribbon is mechanically deformed and scrap areas are separated from the desired lamination by punching out said scrap areas.

9. The method of claim 4 wherein the width of said crystalline lines is no greater than twice the material thickness.

10. A method of cutting thin amorphous metal ribbon material comprising the steps of:
- moving an electron beam and said amorphous metal ribbon relative to one another so that electrons penetrate at least partly through the thickness of the amorphous metal material and heat local regions of the material above its crystallization temperature without producing melting and result in the formation of crystalline lines; and
- mechanically deforming said ribbon to fracture the material along said crystalline lines and separate an amorphous metal lamination with the desired shape which does not have burrs along the fractured edges.

11. A method of continuously forming laminations from a ribbon of amorphous metal material comprising the steps of:
- passing the amorphous metal ribbons at high speeds under an optically deflected focused laser beam to form a desired outline of crystallization lines within the amorphous metal which has a non-crystalline structure; and
- mechanically deforming said ribbon to fracture the material along said crystalline lines and separate burrless amorphous metal laminations.

12. A method of continuously forming laminations from a ribbon of amorphous metal material comprising the steps of:
- passing the amorphous metal ribbon at high speeds under a magnetically deflected focused electron beam to form a desired outline of crystallization lines within the amorphous metal which has a non-crystalline structure; and
- mechanically deforming said ribbon to fracture the material along said crystalline lines and separate burrless amorphous metal laminations.

13. The method of claim 12 wherein said electron beam is deflected electrostatically.

* * * * *